Figure 1:
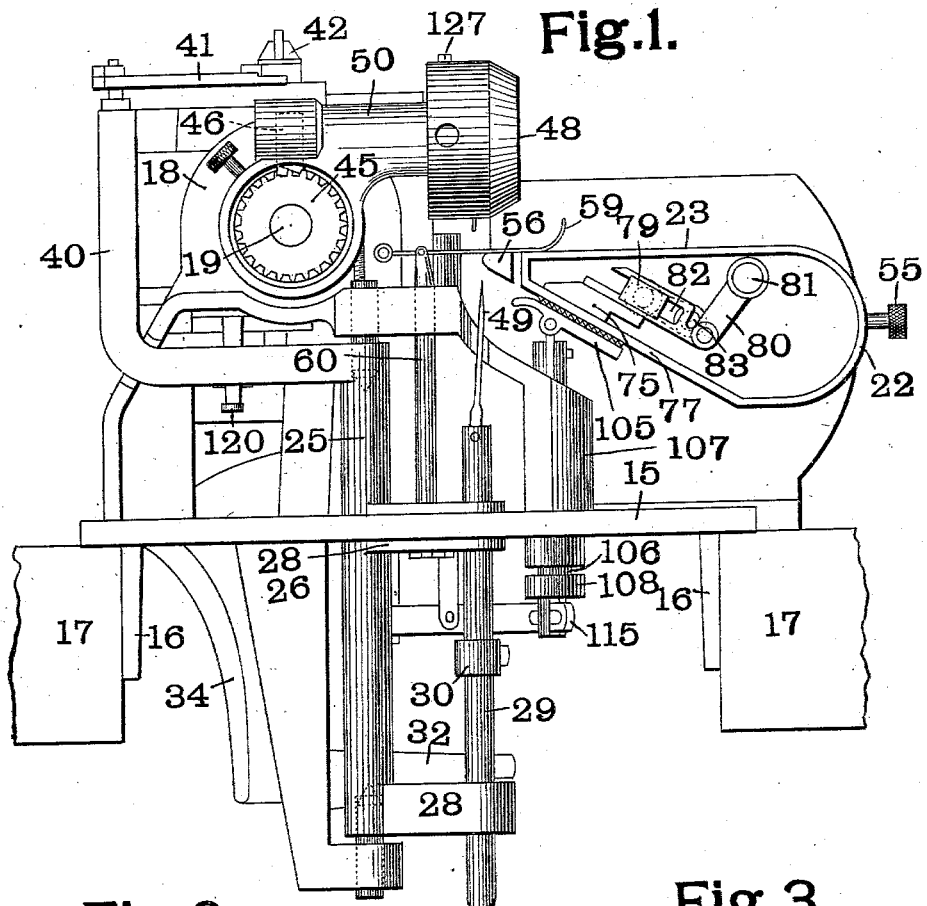

No. 746,853. PATENTED DEC. 15, 1903.
J. G. LEWIS.
BLINDSTITCH SEWING MACHINE.
APPLICATION FILED JAN. 27, 1900.
NO MODEL. 7 SHEETS—SHEET 1.

Witnesses
W. H. Alexander
David Stannard

Inventor
John G. Lewis
By Attorneys
Fowler & Fowler

No. 746,853. PATENTED DEC. 15, 1903.
J. G. LEWIS.
BLINDSTITCH SEWING MACHINE.
APPLICATION FILED JAN. 27, 1900.
NO MODEL. 7 SHEETS—SHEET 2.

Witnesses
W. H. Alexander
David Stannard

Inventor
John G. Lewis
By Attorneys
Fowler & Fowler

No. 746,853. PATENTED DEC. 15, 1903.
J. G. LEWIS.
BLINDSTITCH SEWING MACHINE.
APPLICATION FILED JAN. 27, 1900.
NO MODEL. 7 SHEETS—SHEET 5.

Witnesses
W. H. Alexander
David Stannard

Inventor
John G. Lewis
By Attorneys
Fowler & Fowler

No. 746,853. PATENTED DEC. 15, 1903.
J. G. LEWIS.
BLINDSTITCH SEWING MACHINE.
APPLICATION FILED JAN. 27, 1900.
NO MODEL. 7 SHEETS—SHEET 6.
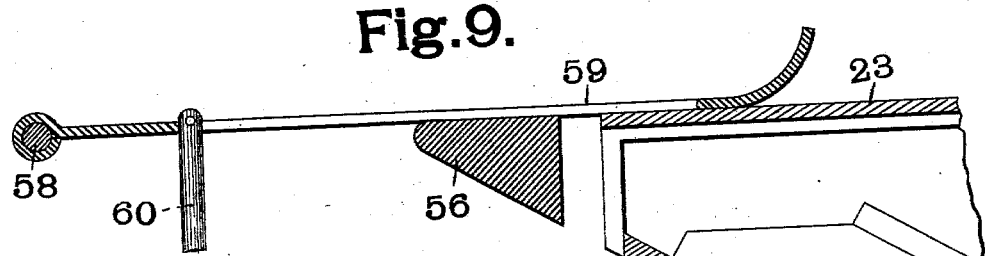
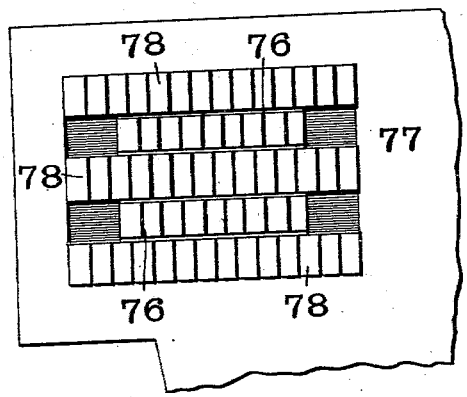
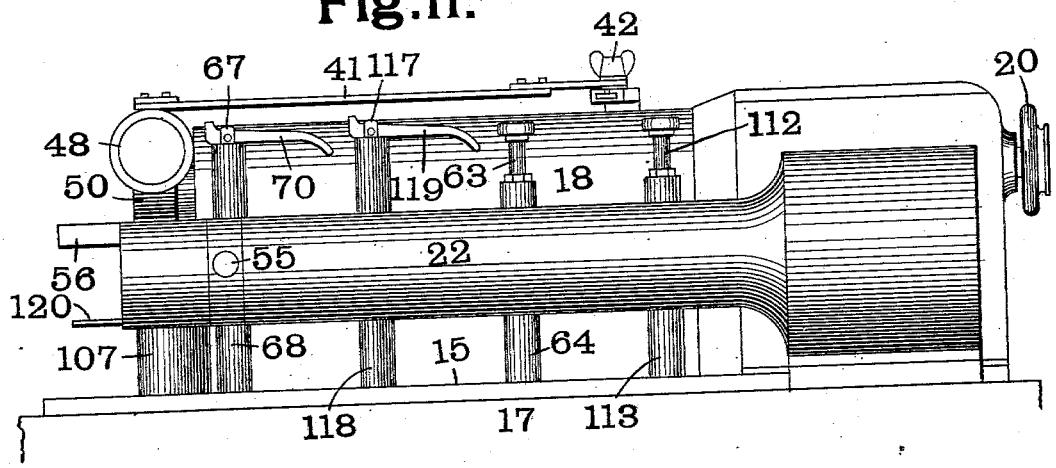
Witnesses
Inventor
John G. Lewis No. 746,853. PATENTED DEC. 15, 1903.
J. G. LEWIS.
BLINDSTITCH SEWING MACHINE.
APPLICATION FILED JAN. 27, 1900.
NO MODEL. 7 SHEETS—SHEET 7.
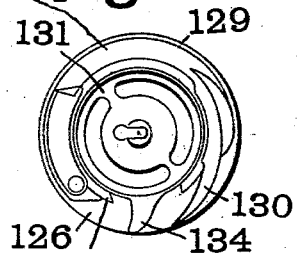
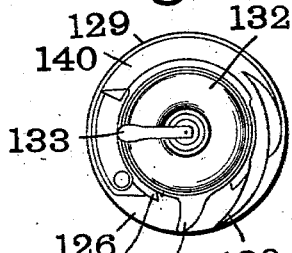
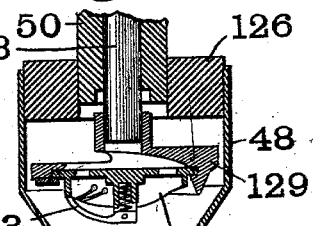
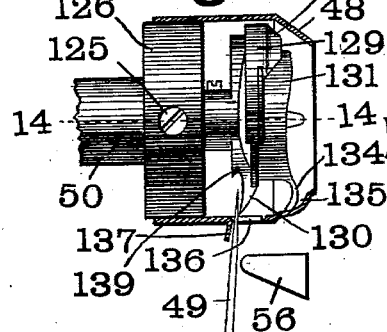
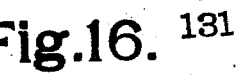
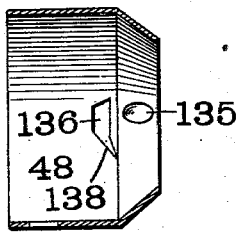
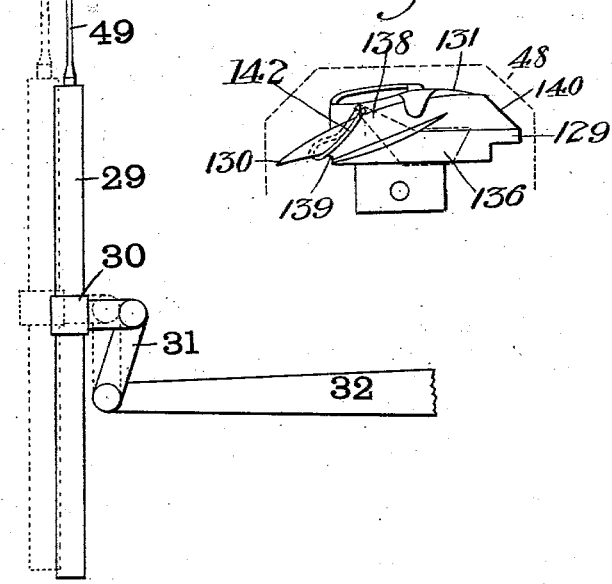
Witnesses
W. H. Alexander
David Stannard
Inventor
John G. Lewis
By Attorneys
Fowler & Fowler
THE NORRIS PETERS CO., PHOTO-LITHO., WASHINGTON, D. C.

No. 746,853. Patented December 15, 1903.

UNITED STATES PATENT OFFICE.

JOHN G. LEWIS, OF ST. LOUIS, MISSOURI.

BLINDSTITCH SEWING-MACHINE.

SPECIFICATION forming part of Letters Patent No. 746,853, dated December 15, 1903.

Application filed January 27, 1900. Serial No. 2,941. (No model.)

*To all whom it may concern:*

Be it known that I, JOHN G. LEWIS, a citizen of the United States, residing at the city of St. Louis, in the State of Missouri, have invented a certain new and useful Sewing-Machine, of which the following is such a full, clear, and exact description as will enable any one skilled in the art to which it appertains to make and use the same, reference being had to the accompanying drawings, forming part of this specification.

One object of my invention is to so construct a sewing-machine for blindstitching as to overcome the tendency of the needle to force the goods around the back guide when it enters the said goods.

Another object of my invention is to so arrange and construct the machine as to leave room for the free passage of the material when the seam or hem is made at a distance from the edge of the goods.

Another object of my invention is to provide for the accurate adjustment of the back guide.

My invention consists in part in the combination, with a back guide, around which the goods are held while the needle is entering the goods, of feeding devices and stitch-forming mechanism provided with a needle whose thrust is opposite to the direction of the feed of the goods.

My invention also consists in part in the combination, with a stitch-forming mechanism, of actuating means therefor, a main housing or casing for said actuating means, and an arm provided with a work table or plate and arranged above the bed-plate of the machine and having an unobstructed space between itself and the main casing and bed-plate for the passage of the material.

My invention also consists in part in the combination, with a back guide around which the goods are bent and stitch-forming mechanism for forming two rows, of stitches unequally distant from the face of said back guide.

My invention also consists in various other novel features and details of construction described in the following specification and pointed out in the claims affixed hereto.

Figure 2:
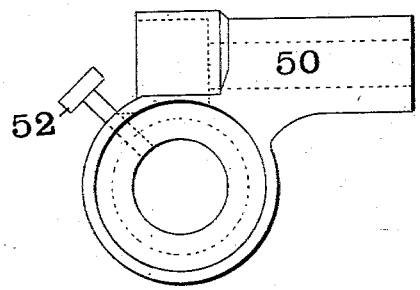
Figure 3:
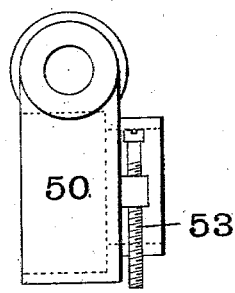
Figure 4:
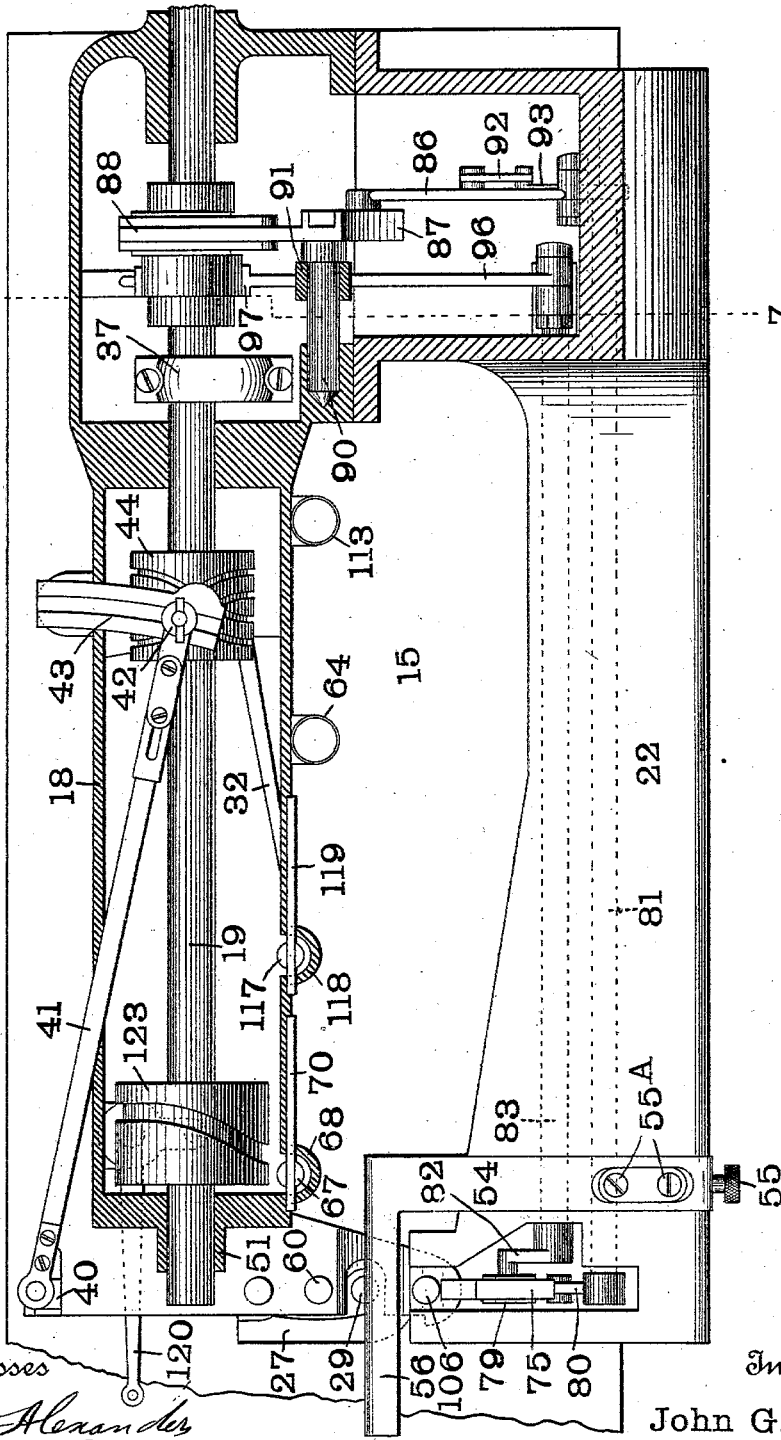
Figure 5:
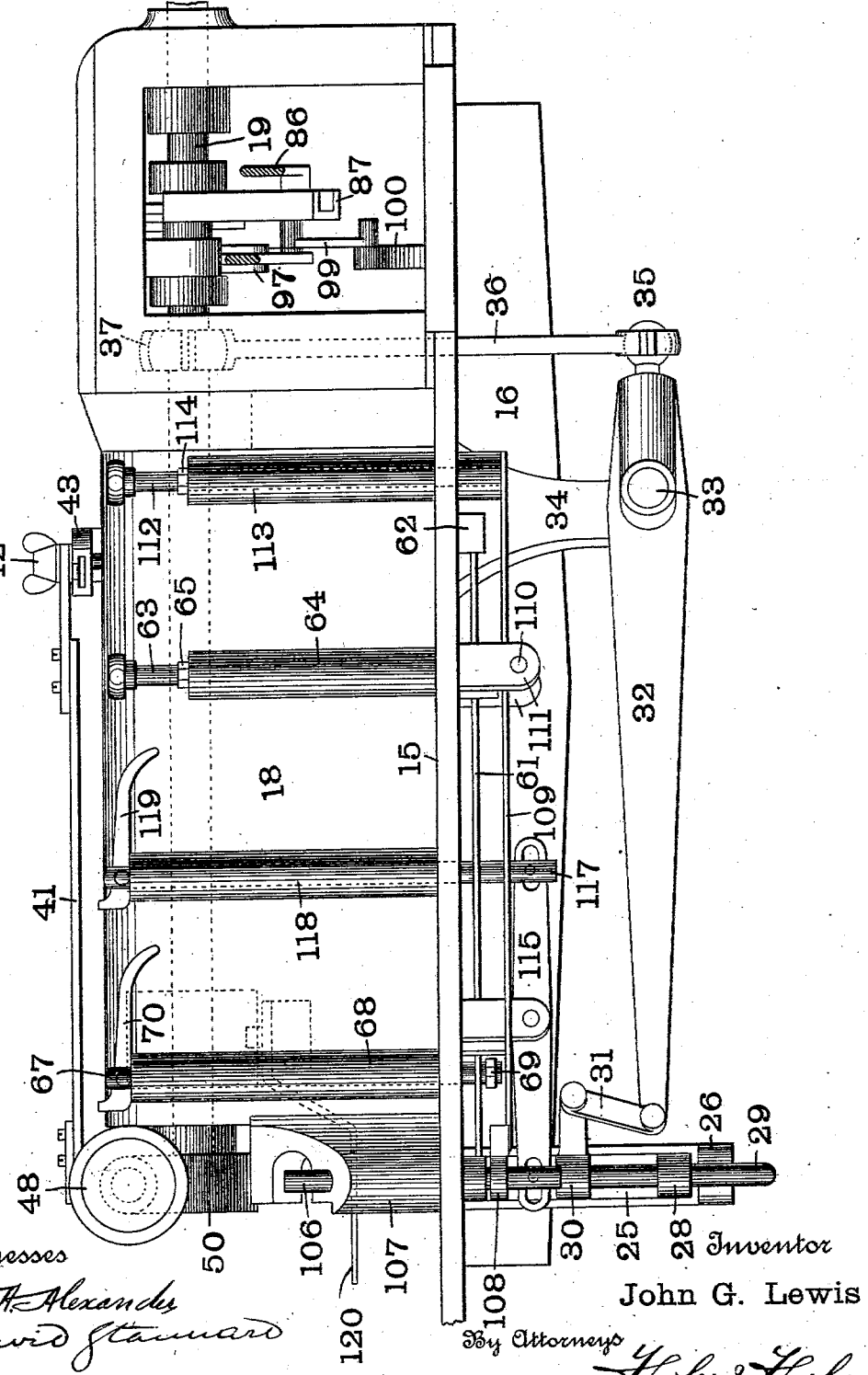
Figure 6:
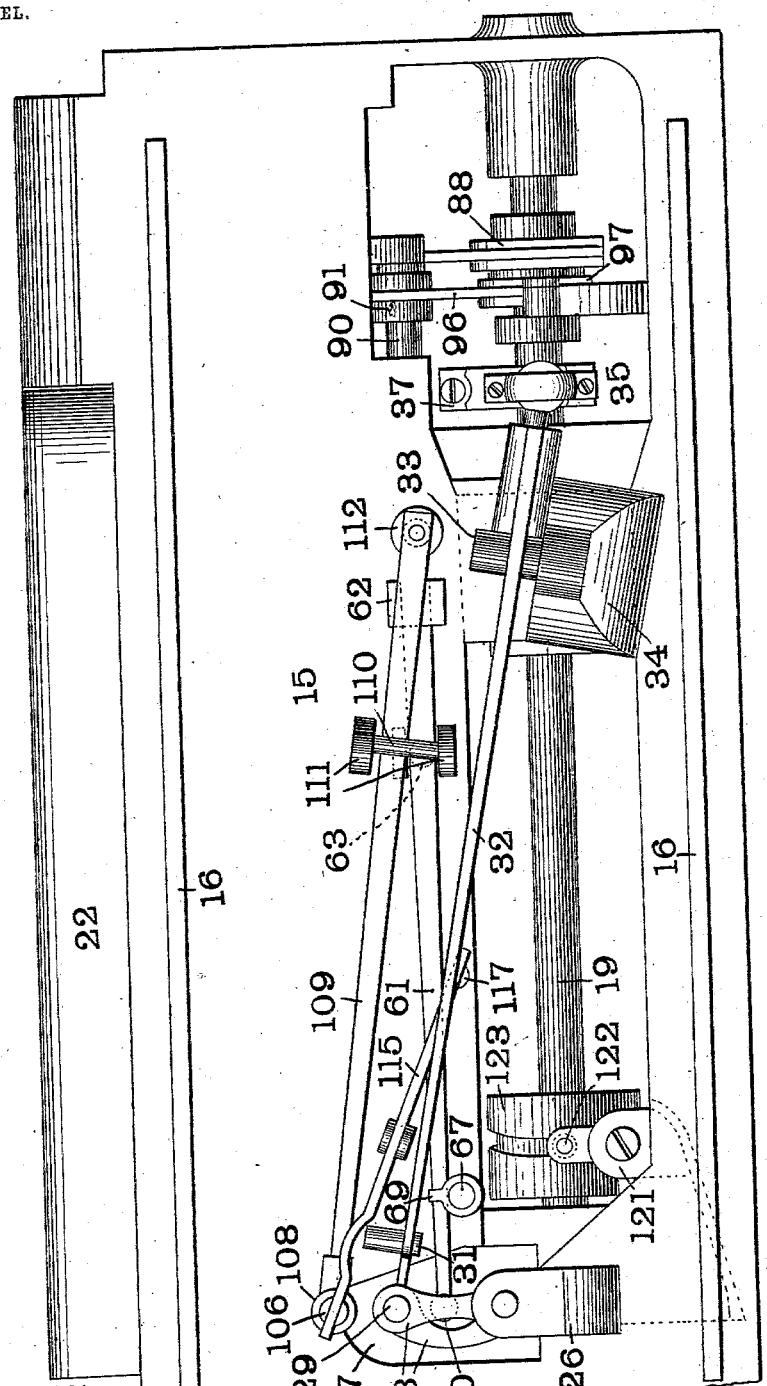
Figure 7:
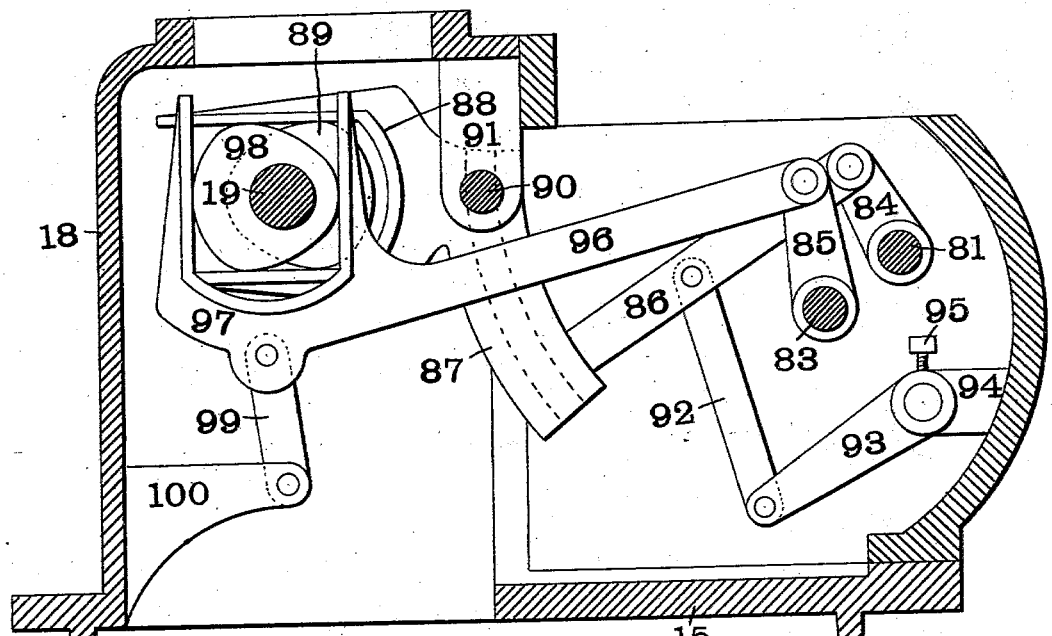
Figure 8:
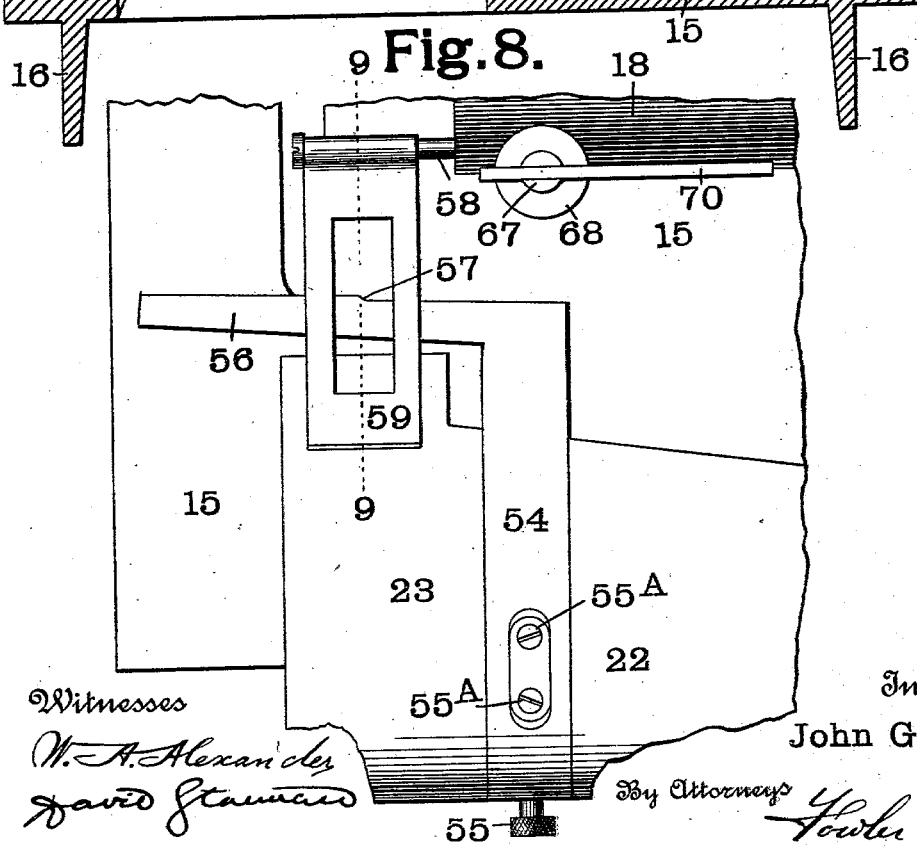

In the accompanying drawings, which illustrate one form of sewing-machine made in accordance with my invention, Figure 1 is an end view. Figs. 2 and 3 are enlarged views of a detail. Fig. 4 is a top plan view, the main casing being shown in section. Fig. 5 is a front view, the arm and some other parts being removed to better show the remaining parts. Fig. 6 is a bottom plan view. Fig. 7 is a slightly-enlarged view on the line 7 7 of Fig. 4. Fig. 8 is a plan view, on an enlarged scale, showing a modified form of back guide. Fig. 9 is a section on the line 9 9 of Fig. 8. Fig. 10 is a bottom plan view of the feed-dog and feed-plate, also on an enlarged scale. Fig. 11 is a front elevation on a reduced scale. Fig 12 is a front view of the hook mechanism, the casing being removed. Fig. 13 is a similar view, but showing the bobbin in position. Fig. 14 is a section on the line 14 14 of Fig. 15. Fig. 15 is a side elevation of the hook mechanism, the case being in section. Fig. 16 is a horizontal section through the hook-case. Fig. 17 is a diagrammatical view showing a detail; and Fig. 18 is a bottom plan view of the hook mechanism, the hook-case being shown in dotted lines.

Like marks of reference refer to similar parts in the several views of the drawings.

15 is the bed-plate of the machine. The bed-plate 15 is preferably provided with downward-extended flanges 16, which are adapted to enter an opening in a suitable table 17, Figs. 1 and 11, and thus hold the machine in place on said table. Carried by the bed-plate 15 and preferably formed integral therewith is a main casing or housing 18, in which is journaled the main or driving shaft 19 of the machine. The main or driving shaft 19 may be provided with the usual form of pulley-wheel 20, Fig. 11, or other suitable means may be provided for applying power to the shaft. Secured to the bed-plate 15 and main casing 18 is an arm 22. The arm 22 extends parallel with the casing or housing 18 and is so arranged as to leave an unobstructed space between itself and the said casing or housing 18 and the bed-plate 15 for the passage of the goods. The outer end of the arm 22 is provided with a work plate or table 23, which is preferably made removable and which coöperates with the stitch-forming mechanism, hereinafter to be described.

25 is a rock-shaft which is pivoted between the main casing 18 and the downwardly-extending bracket 26, carried by the bed-plate 15. Extending forwardly from the rock-shaft 25 are two arms 28, in which is slidingly mounted a needle-bar 29. Secured to the needle-bar 29 is a collar 30, to which is pivoted one end of a link 31, Fig 5, the other end of which is pivoted to a lever 32. The lever 32 is pivoted at 33 to a downwardly-extending bracket 34, carried by the bed-plate 15. The end of the lever 32 is secured by a ball-and-socket joint 35 to one end of a rod 36, the other end of which is provided with an eccentric-strap 37, surrounding an eccentric on the main shaft 19. The rotary motion of the shaft 19 is changed to a longitudinal motion by the eccentric and communicated through the rod 36, lever 32, and link 31 to the needle-bar 29, which is thus caused to reciprocate longitudinally in the arms 28.

The rock-shaft 25 is provided with a rearwardly and upwardly extending L-shaped arm 40, the upper end of which is pivotally connected to a link 41. The link 41 is adjustably connected by means of a thumb-nut 42 to a vibrating segment 43, actuated by a switch-cam 44, Fig. 4, on the main shaft 19. The motion of the main shaft 19 is thus communicated through the cam 44, segment 43, arm 41, and rock-shaft 25 to the needle-bar 29, which is thus caused to vibrate laterally. The use of the link 31 enables the needle-bar 29 to be reciprocated laterally without interfering with its thrust. The link 31 also causes the needle-bar to have a greater thrust when it is moved away from the center of the hook mechanism, as best shown in Fig. 17. This insures the engagement of the hook with the needle-loop, which otherwise might not take place on account of the hook passing the needle at a higher point in this position than when the needle-bar is in line with the center of the hook mechanism. It will thus be seen that the use of the link 31 insures the proper height of the needle at the time of taking the loop, and in order to insure the loops being perfectly formed the hook is made to rotate twice during each stroke of the needle. It will be evident that if the hook rotated at the same speed as the eccentric operating the needle—*i. e.*, if the hook made one rotation to each thrust of the needle—the loop would be more perfectly formed during the time it is taken from the needle in one position than when the needle is in the other position, as the eccentric would pass through a greater distance in one instance than in the other, such distance depending upon the difference in position of the needle, as shown in full in the dotted lines in Fig. 17. However, by making the hook rotate twice to each thrust of the needle this distance is only one-half as great, and in practice this reduces it to such a small amount that it does not interfere with the proper formation of the loop.

The above-described feature of varying the depth of the thrust of the needle, together with the combination of the laterally-vibrating needle and two-to-one rotation of the hook, is shown and claimed in application, Serial No. 155,859, filed May 6, 1903, which application is a division of the present application.

Secured to the end of the main shaft 19 is a spiral gear 45, which meshes with a spiral gear 46, (shown in dotted lines, Fig. 1,) which drives a rotary-hook mechanism, hereinafter to be described, in a hook-case 48. The rotary hook coöperates with a needle 49, carried by the needle-bar 29, to form the stitches, and the spiral gears 45 and 46 are of such proportion as to cause said rotary hook to revolve twice during each stroke of the needle-bar 29. The needle 49 instead of being set straight in the needle-bar 29 in the usual manner is inclined forward, as shown in Figs. 1 and 15. This inclination of the needle enables the point of the needle to be brought close to the back guide, so as to pierce very thin goods, and at the same time prevents the shaft of the needle from chafing against the back guide, which would tend to cut through the goods and allow the stitches to show. The gears 45 and 46 are inclosed in a gear-case 50. (Shown in detail in Figs. 2 and 3.) The said gear-case 50 is secured to the main casing 18, preferably by means of a boss 51, Fig. 4, and set-screw 52. The position of the gear-case 50 is determined by a set-screw 53, which forms an adjustable stop. By loosening the set-screw 52 the gear-case 50, together with the rotary-hook case 48, can be thrown upward and backward, so as to allow for the insertion or threading of the needle and also to allow the goods to be readily bent around the back guide 56. When the gear-case 50 and rotary-hook case 48 are brought back into position, the set-screw 53 determines the position of same, thus preserving the time of the hook. By moving the screw 53 up or down the hook can be adjusted to a longer or shorter needle.

54 is a sliding member carrying a back guide 56, which extends between the work-plate 23 and the path of the needle 49. The sliding member 54 is adjustable by means of a screw 55 and is firmly secured in position after adjustment by means of screws 55$^A$. The face of the back guide 56 may be straight, as shown in Fig. 4, or it may be provided with an offset 57, as shown in Fig. 8, so that the two rows of stitches will pierce the cloth at unequal distances from the back guide.

In the end of the main casing 18 is a pin or rod 58, Fig. 9, to which is pivotally secured a drag-foot 59, which bears upon the work-plate 23 and back guide 56. Secured to the drag-foot 59 is a rod 60, which passes down through the main casing 18 and is secured at its lower end to a spring 61. The opposite end of the spring 61 is secured to a block 62, carried by the bed-plate 15. Bearing on the spring 61 is the end of a rod 63, which passes up through a cylindrical projection 64 on the side of the main casing 18. The rod 63 is provided with an adjusting-nut 65, by which its pressure upon the spring 61 is adjusted, thus regulating the pressure of the drag-foot 59 on the work-plate 23 and back guide 56. In order to withdraw the pressure of the drag-foot 56 from the said work-plate and back guide, I provide a rod 67, passing down through a cylindrical projection 68 on the side of the main casing 18. The lower end of this rod 67 is provided with a finger 69, (best shown in Fig. 6,) which terminates under the spring 61. The upper end of the rod 67 is provided with a cam 70, by means of which it can be drawn upward, thus raising the end of the spring 61 and relieving the pressure of the drag-foot 59 on the work-plate and back guide.

Contained in the end of the arm 22 is a feed-dog 75, provided with feed-points 76. The feed-points 76 project through a feed-plate 77, which is provided with stationary points 78, arranged in the same direction as the feed-points 76. The feed-dog 75 is arranged to slide on a block 79 and is actuated by means of a link 80, secured to the end of a rock-shaft 81. The block 79 is secured to an arm 82, projecting from the end of a rock-shaft 83. The rock-shafts 81 and 83 extend through the arm 22 and have secured to them arms 84 and 85, respectively. The arm 84 is pivotally connected to one end of a link 86, the other end of which is adjustably connected to a pivoted segment 87. The segment 87 carries a U-shaped part 88, actuated by a cam 89, secured on the main shaft 19. The segment is pivoted on a stud 90, secured in the main casing 18 and a depending lug 91. Pivoted to the link 86 is a link 92, the opposite end of which is secured to an arm 93, adjustably secured to a bracket 94 by a set-screw 95. Pivoted to the arm 85 is a link 96, carrying a U-shaped part 97, which is actuated by a cam 98, secured to the main shaft 19. The U-shaped part 97 is pivoted to one end of a link 99, the other end of which is pivoted to a bracket 100, carried by the main casing 18.

Coöperating with the feed-dog 75 and feed-plate 77, hereinbefore described, is a presser-foot 105, Fig. 1. The presser-foot 105 is carried by a presser-foot bar 106, which passes down through a forwardly-extending portion 107 of the main casing 18. Secured to the presser-foot bar 106 is a collar 108, to which is attached one end of a spring 109. The spring 109 passes over a rod 110, carried by lugs 111, and is secured at its opposite end to the lower end of a rod 112, passing up through a cylindrical projection 113 on the main casing 18. The rod 112 is provided with an adjusting-nut 114, Fig. 5, by means of which its pressure on the spring 109, and consequently the pressure of the presser-foot 105 against the feed dog and plate, may be regulated. Pivoted to the lower end of the rod 106 is one end of a lever 115, the opposite end of which is secured to a rod 116, passing up through a cylindrical projection 118 on the main casing 18. The upper end of the rod 116 is provided with a cam 119, by means of which it can be raised, thus releasing the pressure of the presser-foot 105 from the feed-dog and feed-plate.

120 is a take-up, which is pivoted to a lug 121. The take-up 120 is provided with a pin or roller 122, which engages with a groove in the cam 123, secured to the main shaft 19. Secured to the end of the gear-case 50, by means of a set-screw 125, is a disk 126, to which the hook-case 48 is secured by means of a screw 127, Fig. 1, or by any other suitable means. Extending through the gear-case 50 into the hook-case 48 is a shaft 128, Fig. 14, which is rigidly secured to the spiral gear-wheel 46. Secured to the end of the shaft 128 is a rotary hook 129, provided with a beak 130. The beak 130 takes the loop from the front side of the needle 49—that is, from the side nearest the back guide 56—and thus prevents the thread from wrapping around the needle, as it would do if the loop were taken from the rear side of the needle 49. Loosely mounted in the rotary member is a bobbin-case 131. The bobbin 132, Fig. 13, is held in place by a spring-actuated retaining-arm 133. The bobbin-case 131 is provided with a detent 134, which engages with a recess 135 in the hook-case 48, and thus prevents the bobbin-case from rotating with the rotary member 129. An opening 136 is formed in the hook-case 48 for the passage of the needle 49. At the rear of the opening 136 is a needle-guide 137, which prevents the needle from being bent backward and also insures the loop being formed at the front of the needle. The opening 136 has an inclined edge 138, Fig. 16. The rotary hook 129 is provided with a loop-carrier 139 and a beveled throw-off surface 140. The bobbin-case 131 is provided with loop-retainer 141. The method of passing the thread around the bobbin and bobbin-case is the same as used in all such rotary hooks where the bobbin-case is carried by the hook. The beak 130 of the hook takes the loop from the needle, passes through the loop 142, Fig. 18, until the recess or loop-carrier 139 comes in contact with the thread, which loop-carrier carries the loop forward in its rotary path. The loop-retainer 141 on the bobbin-case engages the front side of the loop, passing one thread of the loop to the rear of the bobbin-case, while the loop proper is still retained by the loop-carrier 139 and carried to a point in the rotation of the hook substantially opposite the point of loop taking. To form the stitch, it is necessary that the loop should be thrown forward on the beveled cast-off surface 140. This is accomplished by the inclined edge 138 in hook-case 48. As the forward motion of the hook brings the strands of the loop against the inclined edge 138, this edge throws said strands forward, as shown in Fig. 18. This causes the threads of the loop 142 to strike against the beveled cast-off 140 as the hook rotates, and consequently the loop is thrown off at the front of the hook by said cast-off.

The operation of my machine is as follows: The cams 70 and 119 are first raised to release the pressure of the drag-foot 59 and the presser-foot 105. The goods are then inserted in the machine, passing between the drag-foot 59, the work-plate 23, and back guide 56, around said back guide and between the feed-plate 77 and the presser-foot 105. The cams 70 and 119 are now moved to their normal position to restore the pressure of the drag-foot and presser-foot. When the main shaft 19 is rotated, the needle-bar 29 and the needle 40 are reciprocated longitudinally past the back guide 56 and between such longitudinal reciprocations is reciprocated laterally by the mechanism hereinbefore described. The action of the feed-dog 75 feeds the goods around the face of the back guide 56, while the action of the drag-foot 59 prevents the said goods from becoming slack, so that the stitches might show through on the opposite side of the goods. The action of the fixed points 78 on the feed-plate 77 prevents the goods from being carried backward by the thrust of the needle 49. The needle 49 cooperates with the beak 130 in the hook-case 48 to form the stitches. By means of the screws 55 and 55^A the back guide 56 can be accurately adjusted to the path of the needle, thus enabling the stitching to be done on the thinnest goods.

Many changes may be made in the form and construction of my machine without departing from the spirit of my invention, and I do not, therefore, wish to limit myself to the exact form of construction shown.

Having fully described my invention, what I claim as new, and desire to secure by Letters Patent of the United States, is—

1. In a sewing-machine for blindstitching, a back guide around which the goods are held while the needle enters the goods, a feeding mechanism, and stitch-forming mechanism provided with a needle whose thrust is in a direction opposite to the feed of the goods.

2. In a sewing-machine for blindstitching, a guide for the goods, and stitch-forming mechanism, said stitch-forming mechanism being provided with a needle inclined to the path of its reciprocation.

3. In a sewing-machine for blindstitching, a back guide, a needle-bar, means for reciprocating said needle-bar, and a needle carried by said needle-bar, the longitudinal axis of said needle being inclined to the longitudinal axis of said needle-bar.

4. In a sewing-machine for blindstitching, a back guide for the goods, and stitch-forming mechanism for forming two rows of stitches at different points in the length of the guide, said points being unequally distant from the face of said guide.

5. In a sewing-machine for blindstitching, a back guide having its face transverse to the direction of the feed of the material, and stitch-forming mechanism provided with a laterally-reciprocating needle arranged to pierce the goods at two points in the direction of the length of the guide, said points being unequally distant from the face of said guide.

6. In a sewing-machine for blindstitching, a stitch-forming mechanism, means for reciprocating the needle of said stitch-forming mechanism laterally, and a back guide having an offset in its face.

7. In a sewing-machine for blindstitching, a stitch-forming mechanism, a back guide, feed mechanism arranged to operate on the goods at one side of said stitch-forming mechanism, and a clamping device arranged at the other side of said stitch-forming mechanism and normally exerting a uniform retarding pressure on said material to hold it taut around said back guide.

8. In a sewing-machine, a main casing or housing provided with stitch-forming mechanism, a lateral arm arranged entirely above the table of the machine and extending parallel with said main casing or housing and an adjustable guide carried by said arm and cooperating with said stitch-forming mechanism.

9. In a sewing-machine, a main casing or housing provided with stitch-forming mechanism, an arm extending parallel with said housing and containing feeding devices and operating mechanism, and an adjustable guide carried by said arm and cooperating with said stitch-forming mechanism.

10. In a sewing-machine, stitch-forming mechanism, operating devices therefor, a main casing or housing for said operating devices, an arm carried by said housing and containing feeding devices and operating mechanism, a work plate or table carried by said arm, and an adjustable back guide also carried by said arm and cooperating with said stitch-forming mechanism.

11. In a sewing-machine for blindstitching, a back guide, a needle, and means for taking the loop from said needle at the side nearest the back guide.

12. In a sewing-machine for blindstitching, a back guide having its face transverse to the direction of the feed of the material, and means for taking the loop from the needle at the side nearest the said back guide.

13. In a sewing-machine for blindstitching, a back guide, a needle, and a rotary hook for said needle, said hook being arranged to take the loop from the side of the needle nearest the guide.

14. In a sewing-machine for blindstitching, a back guide, a needle, a loop-taking device for said needle, and means for adjusting said loop-taking device toward and from said back guide.

15. In a sewing-machine for blindstitching, a back guide, a needle, a loop-taking device for said needle means for moving said loop-taking device from said back guide, and an adjustable stop for said loop-taking device.

16. In a sewing-machine, a needle, a pivotally-mounted loop-taking device for said needle, and an adjustable stop for limiting the movement of said loop-taking device toward the needle.

17. In a sewing-machine for blindstitching, a back guide, a needle, a rotary hook mechanism, and a thread-guide inclined to the plane of rotation of the hook for throwing the base of the loop from said rotary hook mechanism at the side of the needle adjacent to said back guide.

In testimony whereof I have hereunto set my hand and affixed my seal in the presence of the two subscribing witnesses.

JOHN G. LEWIS. [L. S.]

Witnesses:
W. A. ALEXANDER,
DAVID STANNARD.